United States Patent Office 3,826,851
Patented July 30, 1974

3,826,851
PROCESS FOR ENHANCING FRESH TOMATO
FLAVOR IN TOMATO PRODUCTS
Dante G. Guadagni, Moraga, and Ron G. Buttery, Richmond, Calif. (both % Western Regional Research Laboratory, Berkeley, Calif. 94710)
No Drawing. Filed Aug. 11, 1972, Ser. No. 279,920
Int. Cl. A23l 1/23
U.S. Cl. 426—65                                   1 Claim

ABSTRACT OF THE DISCLOSURE

The flavor of processed tomato and other food products is significantly improved by the addition of a mixture composed of cis-hex-3-enal, 2-methylhept-2-en-6-one, eugenol, and β-ionone.

---

A non-exclusive, irrevocable, royalty-free license in the invention herein described, throughout the world for all purposes of the United States Government, with the power to grant sublicenses for such purposes, is hereby granted to the Government of the United States of America.

DESCRIPTION OF THE INVENTION

This invention relates to and has among its objects the prvision of a novel process for imparting a fresh tomato flavor to food products. Further objects of the invention will be evident from the following description wherein parts and percentages are by weight unless otherwise specified.

It is well-known that tomatoes contain small but significant amounts of volatile aroma components, which provide characteristic pleasing fresh tomato odor and flavor. When tomatoes are processed by conventional techniques such as dehydration and canning, many of these components are lost by evaporation. As a consequence, the preserved product is flat or lacking in the desired fresh tomato flavor.

The object of the present invention is to obviate the problem outlined above. The mixture of the invention enables one to restore fresh tomato aroma to processed tomato products, thereby making these products much more pleasing to the palate.

In accordance with the invention, a mixture of cis-hex-3-enal, 2-methylhept-2-en-6-one, eugenol, and β-ionone is incorporated with the food material. Hereinafter, said mixture of compounds will be referred to at FTA (fresh tomato aroma). The components of FTA have the following structures:

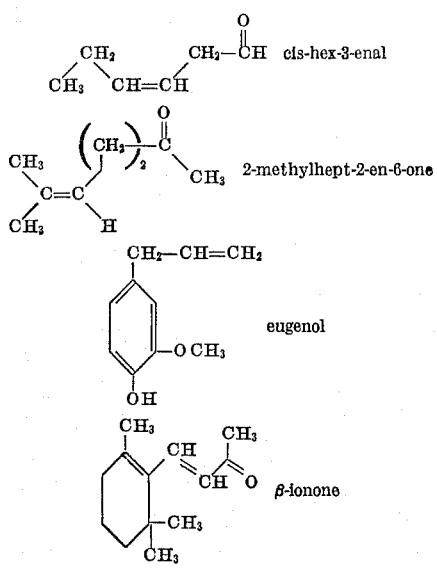

FTA exhibits an intense aroma of fresh tomatoes and can be used in minor proportions for imparting a fresh tomato flavor to dehydrated tomato powder, tomato juice and paste, whole tomatoes, tomato soup, ketchup, and the like. It is also within the scope of the invention to use FTA to impart a fresh tomato aroma to other foods, such as soups, gravies, stews, sauces, aspics, and so forth.

In using FTA as a flavoring agent, it is incorporated in the food in the same way as one would incorporate any flavoring or seasoning agent. Because of its intense flavoring value, FTA is ordinarily employed in a minor proportion, for example, in a concentration of 1 to 10 parts per million. It is obvious, however, that there is nothing critical about the concentration which is used; it is simply a matter of attaining a desired flavor level appropriate to the food in question.

FTA may be added directly to the food to be treated, or it may first be incorporated with a diluent to increase its bulk so that small amounts of the compound may be accurately metered into the food. As the diluent, one may use liquid or solid carriers such as water, ethyl alcohol, glycerol, edible fats or oils, starch, sorbitol, salt, sugar, gelatin, flour, citric acid, powdered skim milk, corn syrup solids, or other non-toxic substances compatible with the material to be treated.

It is, of course, within the compass of the invention to use FTA in combination with other flavoring agents. For example, one may mix a carrier with FTA and with a known flavoring agent such as salt, monosodium glutamate, onion powder, garlic powder, black pepper, paprika, or dried herbs such as parsley, oregano, celery, sage, and the like.

Generally, to achieve the desired fresh tomato aroma the components of FTA, cis-hex-3-enal, 2-methylhept-2-en-6-one, eugenol, and β-ionone, are employed in a ratio of 20:1:7:1, respectively. This ratio is not critical, however; thus, the amount of any individual component may be varied by as much as 20%. What is critical is that all of the components must be present to achieve fresh tomato aroma. That is to say, each component taken separately does not exhibit an aroma similar to that of either fresh tomatoes or FTA. It is the unique combination thereof that is important to the invention.

An advantage of the mixture of the invention is that it maintains fresh tomato flavor in food products even after periods of storage. This is an extremely important attribute since a great deal of time elapses between preparation of the food and use by consumer. After processing, the food is subject to storage at the warehouse, in transit to and at the market, and in the home.

One example of the use of FTA as a flavoring agent concerns tomato juice powder prepared by the "foam-mat" process described in U.S. Pat. 2,967,109 (Morgan et al.). As a result of the dehydration techniques employed in this process, many of the fresh tomato volatiles are lost. FTA can be used to impart fresh tomato aroma to this product. Thus, prior to packaging, FTA may be incorporated with the powder either directly or by using one of the aforementioned diluents. When the consumer reconstitutes the powder by adding water, he can prepare tomato juice with a pleasing fresh tomato flavor and aroma.

The invention is further demonstrated by the following illustrative examples. Portions of the examples are not illustrative of the invention but are provided simply for purposes of comparison.

EXAMPLE

Comparison of Tomato Juices Prepared With and Without FTA

The components of FTA were obtained from reliable commercial sources or were synthesized by well-established procedures. All compounds were purified by preparative gas-liquid chromatography before use.

Control tomato juice was prepared by rehydrating tomato juice powder produced by the "foam-mat" drying technique described in U.S. Pat. 2,967,109 (Morgan et al.). The powder was stored at 34° F. prior to use. For reconstitution, 10 g. of powder was mixed with 90 ml. of water.

Tomato juice of the invention was prepared as follows: 1.0 mg. of 2-methylhept-2-en-6-one, 20.0 mg. of cis-hex-3-enal, 7.0 mg. of eugenol, and 1.0 mg. of β-ionone were mixed with 1 kg. of "foam-mat" tomato juice powder. Then, the powder was rehydrated by the addition of water as described for the control above.

The odor and taste of the control and the control plus FTA were evaluated by a panel of about fifty trained judges. Each judge was given a sample of both juices and was asked to smell and taste each and to pick the juice with the freshest tomato aroma.

The experiment was repeated several times except that instead of juice with FTA, the control was compared against juice prepared from "foam-mat" powder containing only:

(A) 0.1 mg. of 2-methylhept-2-en-6-one, 2.0 mg. of cis-hex-3-enal, and 0.7 mg. of eugenol;
(B) 0.1 mg. of 2-methylhept-2-en-6-one, and 2.0 mg. of cis-hex-3-enal;
(C) 0.1 mg. of 2-methylhept-2-en-6-one;
(D) 2.0 mg. of cis-hex-3-enal;
(E) 0.7 mg. of eugenol; and
(F) 0.1 mg. of β-ionone.

The results are summarized below.

| Additive | N* | Control, plus additive | Control |
|---|---|---|---|
| FTA | 54 | 43 | 11 |
| FTA | 48 | 40 | 8 |
| A** | 44 | 25 | 19 |
| B*** | 48 | 19 | 29 |
| 2-methylhept-2-en-6-one | 42 | 22 | 20 |
| Cis-hex-3-enal | 42 | 25 | 17 |
| Eugenol | 44 | 24 | 20 |
| β-Ionone | 46 | 24 | 22 |

*N = Total number of judges.
**A = 2-methylhept-2-en-6-one, cis-hex-3-enal, and eugenol.
***B = 2-methylhept-2-en-6-one and cis-hex-3-enal.

Having thus described our invention, we claim:

1. A method for imparting fresh tomato flavor to tomato and other food products, which comprises adding thereto 1–10 parts per million of a mixture consisting of 16–24 parts of cis-hex-3-enal, 0.8–1.2 parts of 2-methylhept-2-en-6-one, 5.6–8.4 parts of eugenol, and 0.8–1.2 parts of β-ionone.

References Cited

Buttery et al., "Characterization of Additional Components of Tomato," J. Agr. Food Chem., vol. 19, No. 3, 1971, pp. 524–529.

JOSEPH M. GOLIAN, Primary Examiner